United States Patent
Koue

(10) Patent No.: US 10,805,854 B2
(45) Date of Patent: Oct. 13, 2020

(54) INFORMATION PROCESSING APPARATUS AND METHOD FOR CONDUCTING WIRELESS COMMUNICATION USING A PLURALITY OF TRANSMISSION METHODS AND CHANNELS

(71) Applicant: FUJI XEROX CO., LTD., Tokyo (JP)

(72) Inventor: Toshiaki Koue, Kanagawa (JP)

(73) Assignee: FUJI XEROX CO., LTD., Tokyo (JP)

(*) Notice: Subject to any disclaimer, the term of this patent is extended or adjusted under 35 U.S.C. 154(b) by 29 days.

(21) Appl. No.: 15/812,326

(22) Filed: Nov. 14, 2017

(65) Prior Publication Data

US 2018/0288668 A1 Oct. 4, 2018

(30) Foreign Application Priority Data

Mar. 29, 2017 (JP) .................... 2017-064911

(51) Int. Cl.
*H04W 36/30* (2009.01)
*H04N 1/327* (2006.01)
(Continued)

(52) U.S. Cl.
CPC ........ *H04W 36/30* (2013.01); *H04N 1/00307* (2013.01); *H04N 1/32797* (2013.01); *H04N 1/33361* (2013.01); *H04N 1/33323* (2013.01); *H04N 2201/006* (2013.01); *H04N 2201/0055* (2013.01); *H04N 2201/0094* (2013.01); *H04W 36/06* (2013.01); *H04W 36/14* (2013.01); *H04W 84/12* (2013.01)

(58) Field of Classification Search
CPC ..... H04W 36/30; H04W 36/14; H04W 36/06; H04N 1/00307; H04N 1/32797; H04N 1/33361; H04N 1/33323; H04N 2201/0055; H04N 2201/006; H04N 2201/0094

See application file for complete search history.

(56) References Cited

U.S. PATENT DOCUMENTS

2005/0227702 A1* 10/2005 Nishimura .......... H04W 72/082
    455/454
2008/0020791 A1* 1/2008 Ito ........................ H04W 36/18
    455/516

(Continued)

FOREIGN PATENT DOCUMENTS

JP    2006-080782 A    3/2006
JP    2010-232724 A    10/2010

OTHER PUBLICATIONS

IEEE, Part 11: Wireless LAN Medium Access Control (MAC) and Physical Layer (PHY) Specifications Amendment 3: Enhancements for Very High Throughput in the 60 GHz Band, IEEE Std 802.11ad-2012, Dec. 28, 2012 (Year: 2012).*

*Primary Examiner* — Robert C Scheibel
(74) *Attorney, Agent, or Firm* — Oliff PLC

(57) ABSTRACT

An information processing apparatus includes a communication unit, a first switching unit, and a second switching unit. The communication unit is configured to conduct a wireless communication using plural transmission methods, one of which has plural channels. The first switching unit switches between the channels according to quality of a communication that is being conducted. The second switching unit switches between the transmission methods when the first switching unit could not switch between the channels.

18 Claims, 11 Drawing Sheets

(51) Int. Cl.
*H04N 1/333* (2006.01)
*H04W 36/06* (2009.01)
*H04W 36/14* (2009.01)
*H04N 1/00* (2006.01)
*H04W 84/12* (2009.01)

(56) References Cited

U.S. PATENT DOCUMENTS

| | | | |
|---|---|---|---|
| 2010/0060801 A1* | 3/2010 | Kimura | H04H 20/08 |
| | | | 348/732 |
| 2014/0113590 A1* | 4/2014 | Meylan | H04W 72/10 |
| | | | 455/411 |
| 2015/0036575 A1* | 2/2015 | Li | H04W 52/0216 |
| | | | 370/311 |
| 2017/0029107 A1* | 2/2017 | Emami | B64C 39/024 |
| 2018/0077617 A1* | 3/2018 | Xue | H04W 36/06 |
| 2018/0167825 A1* | 6/2018 | Egner | H04W 16/16 |

\* cited by examiner

FIG.7

| CHANNEL | IN-USE | USED |
|---|---|---|
| 1ch | | ○ |
| 2ch | ○ | |
| 3ch | ○ | |
| 4ch | | ○ |
| 5ch | | |
| 6ch | | ○ |
| 7ch | | |
| 8ch | | ○ |
| 9ch | | |
| 10ch | ○ | |
| 11ch | | |
| 12ch | | ○ |
| 13ch | | |
| 14ch | | |

FIG.8

| CHANNEL | IN-USE | USED |
|---|---|---|
| 36ch | O | |
| 40ch | O | |
| 44ch | | |
| 48ch | | O |
| 52ch | | O |
| 56ch | | |
| 60ch | | |
| 64ch | | |
| 100ch | O | |
| 104ch | | |
| 108ch | | |
| 112ch | | O |
| 116ch | | O |
| 120ch | | O |
| 124ch | | |
| 128ch | | |
| 132ch | O | |
| 136ch | O | |
| 140ch | | |

INFORMATION PROCESSING APPARATUS AND METHOD FOR CONDUCTING WIRELESS COMMUNICATION USING A PLURALITY OF TRANSMISSION METHODS AND CHANNELS

CROSS-REFERENCE TO RELATED APPLICATIONS

This application is based on and claims priority under 35 USC 119 from Japanese Patent Application No. 2017-064911 filed Mar. 29, 2017.

BACKGROUND

Technical Field

The present invention relates to an information processing apparatus and a non-transitory computer readable storage medium.

SUMMARY

According to an aspect of the invention, an information processing apparatus includes a communication unit, a first switching unit, and a second switching unit. The communication unit is configured to conduct a wireless communication using plural transmission methods, one of which has plural channels. The first switching unit switches between the channels according to quality of a communication that is being conducted. The second switching unit switches between the transmission methods when the first switching unit could not switch between the channels.

BRIEF DESCRIPTION OF THE DRAWINGS

Exemplary embodiments of the present invention will be described in detail based on the following figures, wherein:

FIG. 7 is an explanatory view illustrating an exemplary data structure of a channel use table;

FIG. 8 is an explanatory view illustrating an exemplary data structure of a channel use table;

DETAILED DESCRIPTION

Hereinafter, an exemplary embodiment suitable for implementing the present invention will be described with reference to the accompanying drawings.

Figure 1:
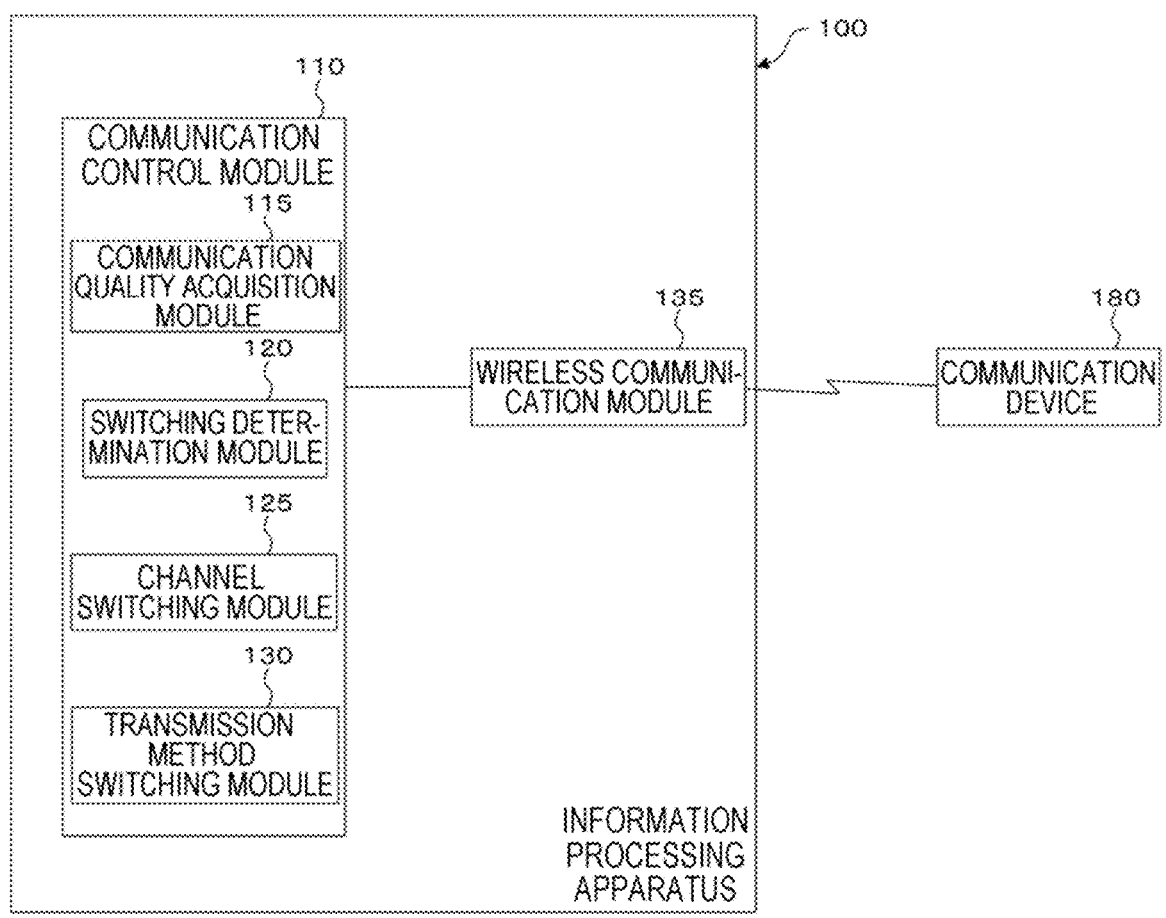
FIG. 1 is a view illustrating a conceptual module configuration relating to an exemplary configuration of an exemplary embodiment.

FIG. 1 is a view illustrating a conceptual module configuration relating to an exemplary configuration of the present exemplary embodiment.

A module, in general, indicates a logically separable component such as software (computer program) or hardware. Accordingly, a module in the present exemplary embodiment indicates not only a module in a computer program but also a module in a hardware configuration. Thus, the descriptions of the present exemplary embodiment also include descriptions of a computer program to serve as a module (a program that causes a computer to execute respective processes, a program that causes a computer to serve as respective units, and a program that causes a computer to implement respective functions), a system, and a method. For the convenience of descriptions, the expressions "store," "caused to store," and equivalent expressions thereto will be used. If an exemplary embodiment is directed to a computer program, the expressions indicate storing data or the like in a memory device or performing a control to cause data or the like to be stored in a memory device. In addition, one module may correspond to one function. In implementation, however, one module may be configured with one program, multiple modules may be configured with one program, and in reverse, one module may be configured with multiple programs. Further, multiple modules may be executed by one computer, or one module may be executed by multiple computers in a distributed or parallel environment. In addition, one module may include another module. Hereinafter, the term "connection" is also used for a logical connection (for example, data exchange, instructions, and a reference relationship among data), in addition to a physical connection. The term "predetermined" refers to being determined prior to a target process. The term "predetermined" includes the meaning of being determined according to a circumstance/state at or until a specific time point not only before a process by the present exemplary embodiment is started, but also prior to a target process even after a process by the present exemplary embodiment is started. If multiple "predetermined values" exist, the values may be different from each other, or two or more of the values (or all values, of course) may be identical to each other. In addition, the description "when it is A, B is performed" indicates that "it is determined whether it is A, and if it is determined that it is A, B is performed," except for a case where it is unnecessary to make the determination as to whether it is A. If items are enumerated like "A, B, and C," the enumeration is merely exemplary and includes a case of selecting only one (for example, only A) of the items, unless otherwise specified.

In addition, a system or device includes a system or device which is implemented with one computer, hardware component, device or the like, in addition to a system or device configured such that multiple computers, hardware components, devices and the like are connected to each other by a communication unit such as a network (including a one-to-one corresponding communication connection). The terms "device" and "system" are synonymous with each other. Of course, the "system" does not include a system merely meaning a social "structure" (social system) which is an artificial engagement.

In addition, target information is read from a memory device per process by each module or for each of multiple processes which are executed in a module. After the process is executed, the process result is stored in the memory device. Accordingly, descriptions of reading from the memory device prior to the process and storing in the memory device after the process may be omitted. Examples of the memory device may include a hard disk, a random access memory (RAM), an external memory medium, a memory device through a communication line, a register within a central processing unit (CPU), and the like.

An information processing apparatus 100 according to the present exemplary embodiment conducts a wireless communication, and includes a communication control module 110 and a wireless communication module 135 as illustrated in the example of FIG. 1.

A communication device 180 is connected to the wireless communication module 135 of the information processing apparatus 100 via a communication line. The communication device 180 is capable of conducting a wireless communication and is, for example, a mobile information terminal, a notebook PC, or an access point. There may be provided multiple communication devices 180 that are capable of conducting a wireless communication with the information processing apparatus 100.

The wireless communication module 135 is connected to the communication control module 110 and also connected to the communication device 180 via a communication line. The wireless communication module 135 is capable of conducting a wireless communication using multiple transmission methods. Further, the wireless communication module 135 is capable of conducting a wireless communication with multiple communication devices 180. The multiple transmission methods may include, for example, IEEE802.11a, IEEE802.11b, IEEE802.11c, IEEE802.11g, IEEE802.11n, IEEE802.11ac, IEEE802.11j, IEEE802.11ad, and Bluetooth (registered trademark).

In addition, at least one of the transmission methods of the wireless communication module 135 has multiple channels (wireless communication paths). Of course, each of all the transmission methods may have multiple channels.

The transmission methods by which the wireless communication module 135 is capable of conducting a wireless communication may include at least the communication standard of IEEE802.11ad.

The communication control module 110 includes a communication quality acquisition module 115, a switching determination module 120, a channel switching module 125, and a transmission method switching module 130. The communication control module 110 is connected to the wireless communication module 135. The communication control module 110 controls the wireless communication between the information processing apparatus 100 and the communication device 180.

The communication quality acquisition module 115 acquires the quality of a communication that is being conducted using the wireless communication module 135. Here, the "quality of a communication" (communication quality) includes a transmission quality, a connection quality, and a stability quality. For example, the "quality of a communication" includes a communication speed (for example, delay and responsiveness), stability (for example, data loss rate and reliability), a coverage range and the like, and specifically corresponds to detecting a reception level of a radio signal, an occurrence of disconnection of a wireless communication during the communication, and the like.

The switching determination module 120 determines whether to switch the communication that is being conducted by the wireless communication module 135, based on the communication quality acquired by the communication quality acquisition module 115. The switching is performed when the communication quality is deteriorated. For example, if the reception level of a radio signal acquired by the communication quality acquisition module 115 is lower than a predetermined threshold value, switching by the channel switching module 125 or the transmission method switching module 130 is performed. In addition, if the communication quality acquisition module 115 detects disconnection of a wireless communication during the communication (or if the number of times of the disconnection is larger than a predetermined threshold value or the disconnection time is longer than a predetermined time), the switching by the channel switching module 125 or the transmission method switching module 130 is performed.

The channel switching module 125 switches between the channels according to the quality of the communication that is being conducted by the wireless communication module 135. Here, the description of "according to the quality of the communication that is being conducted" corresponds to, for example, (i) a case where the reception level of a radio signal from the communication device 180 as a communication counterpart is low, (ii) a case where a communication is disconnected during the communication, or the like. "Switching between the channels" includes, for example, changing a frequency.

In addition, the channel switching module 125 may switch between the channels when the number of times of the switching is less than or equal to or less than a predetermined value.

In addition, the channel switching module 125 may switch to a channel different from an already selected channel.

In addition, the channel switching module 125 may switch to a channel having a frequency band that does not overlap with that of an already selected channel.

The transmission method switching module 130 switches between the transmission methods when the channel switching module 125 could not switch between the channels. "Switching between the transmission methods" includes, for example, switching from IEEE802.11b to IEEE802.11n. In addition, the switching may be switching from one frequency band to another frequency band. For example, the switching may switch from a transmission method of 2.4 GHz to a transmission method of 5 GHz. That is, switching between the transmission methods within the same frequency band may not be performed.

In addition, if the number of times of the switching by the channel switching module 125 is larger than or equal to or larger than a predetermined value, the switching by the transmission method switching module 130 may be performed.

In addition, if the channel switching module 125 could not select a different channel from an already selected channel, the switching by the transmission method switching module 130 may be performed.

In addition, if the channel switching module 125 could not select a channel having a frequency band that does not overlap with an already selected channel, the switching by the transmission method switching module 130 may be performed.

In addition, the transmission method switching module 130 may switch a transmission method to IEEE802.11ad.

Figure 2A:
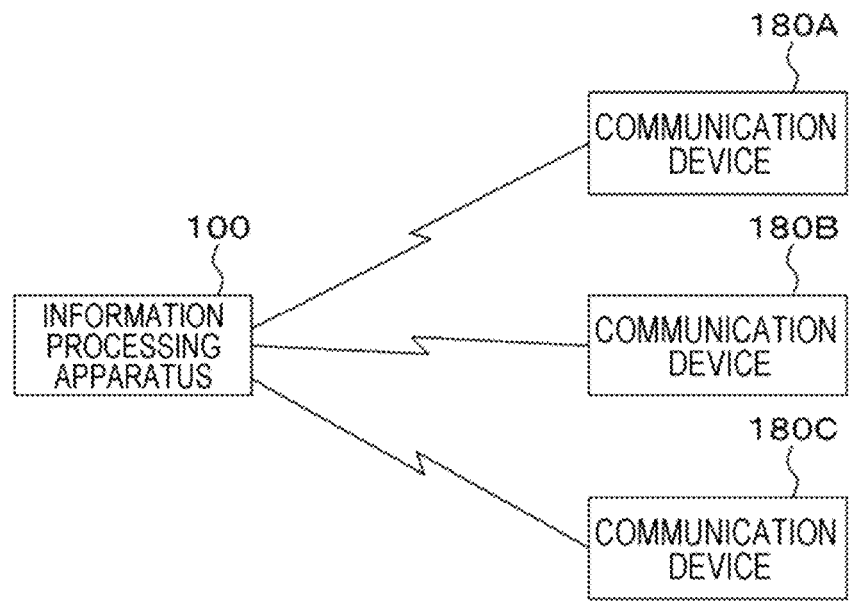
FIGS. 2A and 2B are explanatory views illustrating an exemplary system configuration using the exemplary embodiment.
Figure 2B:
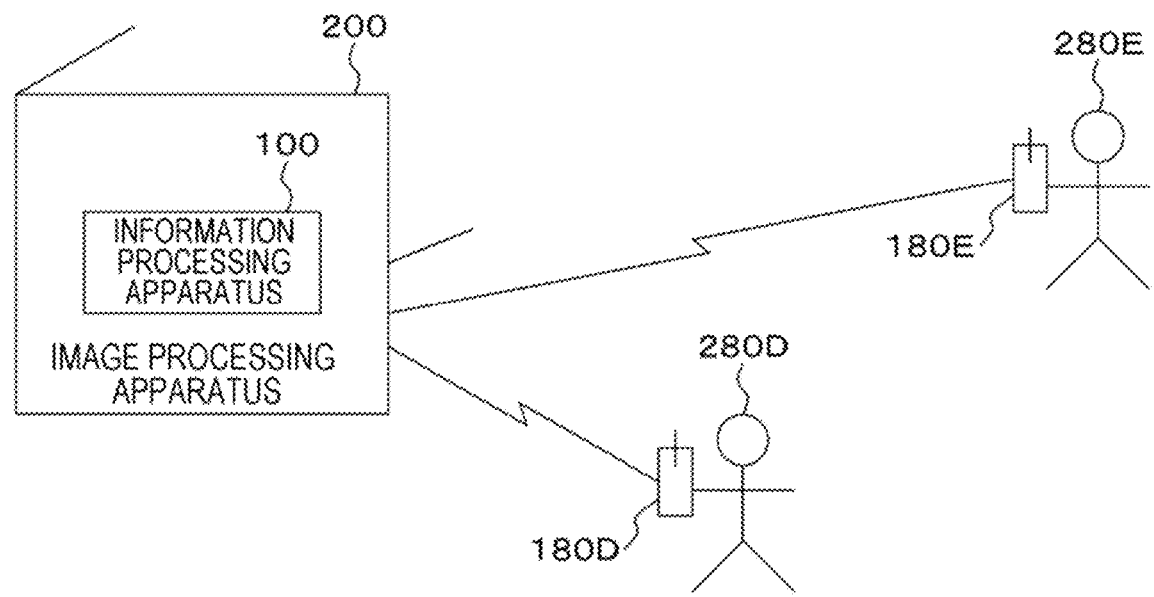

FIGS. 2A and 2B are explanatory views illustrating an exemplary system configuration using the present exemplary embodiment.

As illustrated in the example of FIG. 2A, the information processing apparatus 100 conducts a wireless communication with multiple communication devices 180 (communication devices 180A, 180B, and 180C). The wireless communication is conducted by a transmission method enabling the mutual communication between the information processing apparatus 100 and the communication devices 180. A channel is determined according to a predetermined algorithm at the time of starting the communication.

In the wireless communication, the communication quality may change during the communication. For example, the communication quality may change due to a usage environment, a congestion status, a malfunction, and the like. More specifically, the communication quality may change due to movement of an obstacle for a wireless communication (for example, an automobile, opening/closing of a door, and persons), movement of the information processing apparatus 100 or the communication devices 180 (for example, movement of the owner of the information processing apparatus 100 or the communication devices 180 when the information processing apparatus 100 or the communication devices 180 are mobile devices), use of another device (for example, a microwave oven and other communication devices), and traffics.

In the information processing apparatus 100 of the present exemplary embodiment, when the quality of the communication that is being conducted is deteriorated, the switching is performed in an order of a channel and a transmission method, for better communication quality.

As illustrated in the example of FIG. 2B, an image processing apparatus 200 may have the information processing apparatus 100.

The image processing apparatus 200 is capable of conducting a wireless communication with a communication device 180D of a user 280D and a communication device 180E of a user 280E.

For example, the user 280D transmits a printing instruction to the image processing apparatus 200 by operating the communication device 180D and gets a printed matter from the image processing apparatus 200. In addition, the user 280E transmits a scanned image to the communication device 180E to store the image in the communication device 180E, by performing a scan operation with the image processing apparatus 200.

Figure 3:
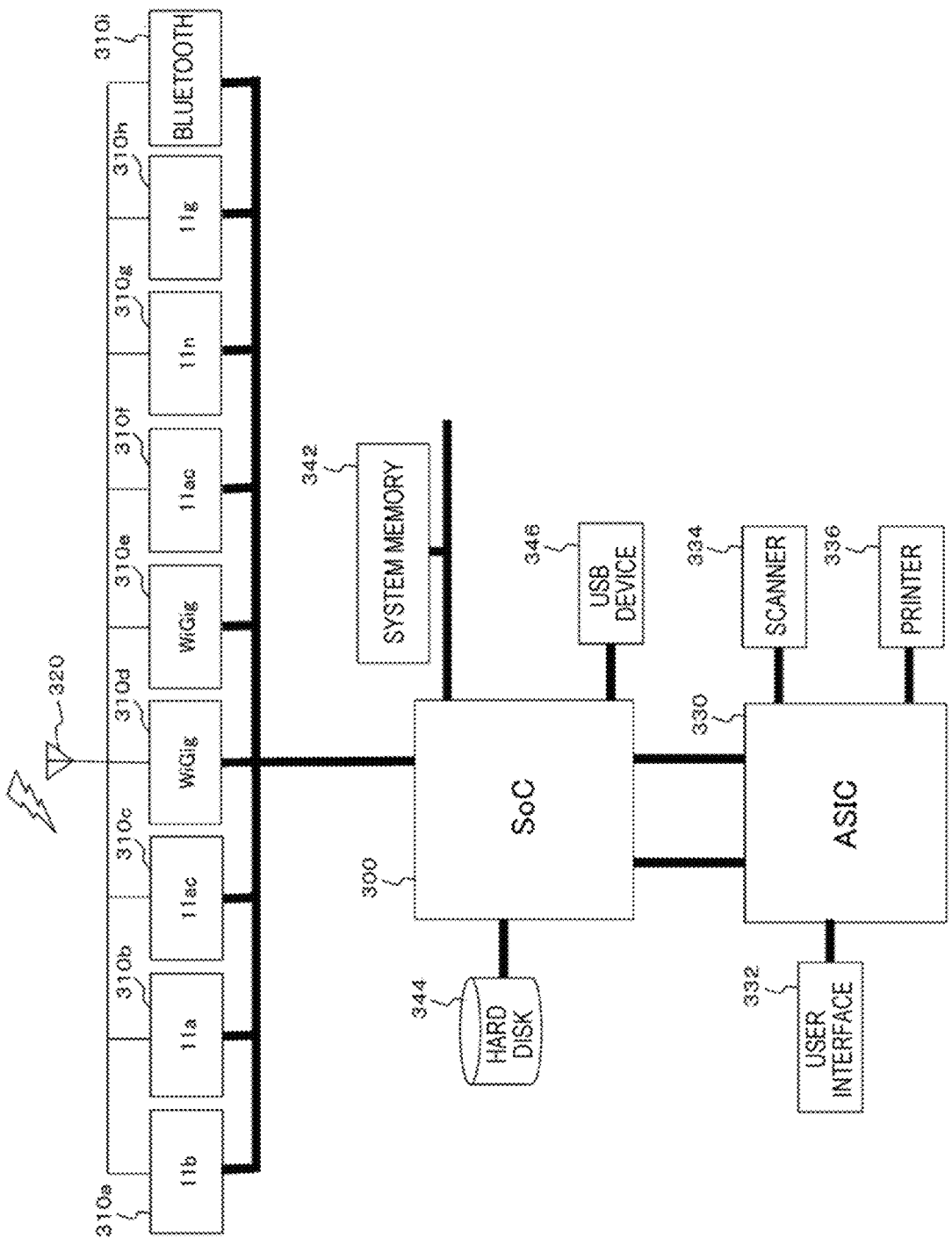
FIG. 3 is an explanatory view illustrating a specific exemplary configuration of the exemplary embodiment.

FIG. 3 is an explanatory view illustrating a specific exemplary configuration of the present exemplary embodiment (the image processing apparatus 200). The image processing apparatus 200 includes a system on a chip (SoC) 300, 11b:310a, 11a:310b, 11ac:310c, WiGig:310d, WiGig:310e, 11ac:310f, 11n:310g, 11g:310h, Bluetooth 310i, an antenna 320, a system memory 342, a hard disk 344, a USB device 346, an application specific integrated circuit (ASIC) 330, a user interface 332, a scanner 334, and a printer 336.

11b:310a is connected to the antenna 320 and the SoC 300. 11a:310b is connected to the antenna 320 and the SoC 300. 11ac:310c is connected to the antenna 320 and the SoC 300. WiGig:310d is connected to the antenna 320 and the SoC 300. WiGig:310e is connected to the antenna 320 and the SoC 300. 11ac:310f is connected to the antenna 320 and the SoC 300. 11n:310g is connected to the antenna 320 and the SoC 300. 11g:310h is connected to the antenna 320 and the SoC 300. Bluetooth 310i is connected to the antenna 320 and the SoC 300. The antenna 320 may be shared. Further, multiple antennas 320 may be provided. The combination of the communication devices (communication chips) 310 and the antenna 320 is an example implementing the wireless communication modules 135 illustrated in the example of FIG. 1. 11b:310a to 11g:310h comply with the "IEEE 802.11 standard" which is the international standard of the wireless communication standard and includes "a," "a/b," "b/g," "a/b/g/n," and the like. Of course, Wireless Fidelity (Wi-Fi) which is a product complying with the above-described standard may be used. Especially, IEEE802.11ad which is a wireless communication standard of the 60 GHz band may be adopted. That is, WiGig (Wireless Gigabit) which is a product complying with IEEE802.11ad may be used. As the transmission method of the wireless communication, transmission methods such as Bluetooth 310i other than the "IEEE802.11 standard" may be used.

The SoC 300 is connected to 11b:310a, 11a:310b, 11ac:310c, WiGig:310d, WiGig:310e, 11ac:310f, 11n:310g, 11g:310h, Bluetooth 310i, the system memory 342, the hard disk 344, the USB device 346, and the ASIC 330. The SoC 300 is an example implementing the communication control module 110. The SoC 300 mainly controls the communication devices (communication chips) 310, the system memory 342, the hard disk 344, and the USB device 346.

The system memory 342 is connected to the SoC 300. The system memory 342 is, for example, a memory used for executing programs of the communication control module 110.

The hard disk 344 is connected to the SoC 300. The hard disk 344 stores, for example, a channel use table 700, a channel use table 800, a transmission method use table 1000, and communication contents.

The USB device 346 is connected to the SoC 300. The USB device 346 reads from and writes into, for example, an external connection device such as a removable storage medium and an IC card. In addition, another communication device may be connected.

The ASIC 330 is connected to the SoC 300, the user interface 332, the scanner 334, and the printer 336. The ASIC 330 controls the scanner 334, the printer 336, the user interface 332 and the like to implement the main functions of the image processing apparatus 200.

The user interface 332 is connected to the ASIC 330. The user interface 332 receives an operation by a user and presents a message or the like to the user by controlling, for example, a liquid crystal display also serving as a touch panel. In addition, the user interface 332 may receive the user's operation (including gaze, gesture, voice, and the like) using a mouse, a keyboard, a camera, a microphone or the like, and may present a message to the user by voice output from a loudspeaker or touch sense using a touching device.

The scanner 334 is connected to the ASIC 330. The scanner 334 reads an image of an original document and transmits the image.

The printer 336 is connected to the ASIC 330. The printer 336 performs printing according to a printing instruction received by the communication devices (communication chips) 310 or the user interface 332.

Figure 4A:
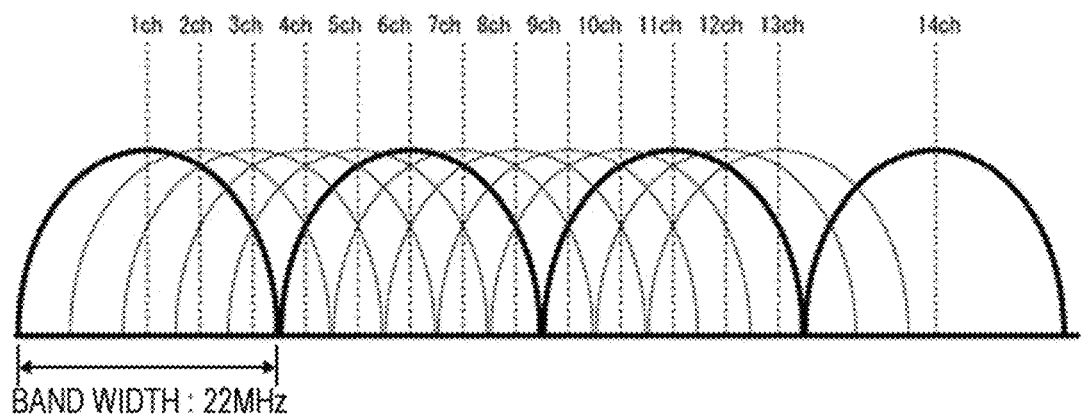
FIGS. 4A and 4B are explanatory views illustrating examples of channels.
Figure 4B:
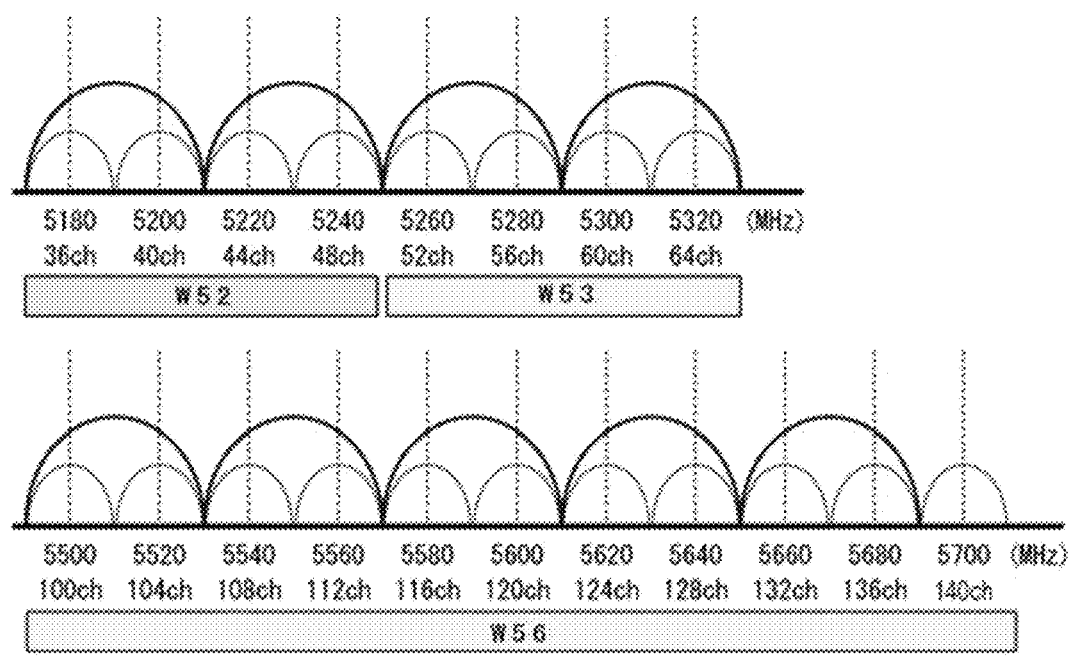

FIGS. 4A and 4B are explanatory diagrams illustrating examples of channels.

For example, descriptions will be made on channels in the "2.4 GHz band" and the "5 GHz band" of the "IEEE 802.11 standard."

The wireless standard using the "2.4 GHz band" is easily affected by other devices and is difficult to conduct a stable communication. For example, if a microwave oven or another identical wireless LAN device exists nearby, the communication often becomes unstable. Meanwhile, compared to the "5 GHz band," radio waves reach far away and are less affected by an obstacle or the like. Further, the "2.4 GHz band" is used by many devices and highly compatible.

Since the "5 GHz band" is used by a small number of devices, the "5 GHz band" is less affected by a microwave oven and the like and may be expected to conduct a stable communication. Meanwhile, when a blocking object exists, the "5 GHz band" is easily affected by the blocking object, as compared to the "2.4 GHz band," and may not conduct a stable communication as the walls increase.

In the above-described IEEE802.11ad of the 60 GHz band, while the possible communication distance is as short as about 10 m, a large capacity and high-speed communication may be conducted. Although IEEE802.11ad of the 60 GHz may not pass over a blocking object due to the strong straight traveling property, the transmission and reception characteristic may be improved by adopting the directivity control by multiple antennas. As described above, since merits and demerits exist depending on the transmission methods, it is effective to switch to another transmission method even during a communication.

The range of frequencies that may be used in a wireless communication is fixed. A frequency band to be used is divided into "channels" within the range such that multiple communication devices may conduct communications simultaneously using different channels.

In IEEE802.11b/g/n using the 2.4 GHz band, the frequency band is divided into 13 channels of 1 ch to 13 ch each having the channel width of 20 MHz in Japan and Europe. The frequency band is divided into 11 channels of 1 ch to 11 ch each having the channel width of 20 MHz in the United States.

In IEEE802.11a/n/ac using the 5 GHz band, the frequency band is divided into 19 channels of 36 ch to 64 ch and 100 ch to 140 ch each having the channel width of 20/40 MHz and 80/160 MHz.

In IEEE802.11ad using the 60 GHz band, the frequency band is divided into four channels of 1 ch to 4 ch each having the channel width of 9 GHz.

As illustrated in the example of FIG. 4A, in IEEE802.11b/g/n using the 2.4 GHz band in Japan, for example, 1 ch has the center frequency of 2,412 MHz and the band of 2,401 MHz to 2,423 MHz, 2 ch has the center frequency of 2,417 MHz and the band of 2,406 MHz to 2,428 MHz, 3 ch has the center frequency of 2,422 MHz and the band of 2,411 MHz to 2,433 MHz, 4 ch has the center frequency of 2,417 MHz and the band of 2,416 MHz to 2,438 MHz, 5 ch has the center frequency of 2,432 MHz and the band of 2,421 MHz to 2,443 MHz, 6 ch has the center frequency of 2,437 MHz and the band of 2,426 MHz to 2,448 MHz, 7 ch has the center frequency of 2,442 MHz and the band of 2,431 MHz to 2,453 MHz, 8 ch has the center frequency of 2,447 MHz and the band of 2,436 MHz to 2,458 MHz, 9 ch has the center frequency of 2,452 MHz and the band of 2,441 MHz to 2,463 MHz, 10 ch has the center frequency of 2,457 MHz and the band of 2,446 MHz to 2,468 MHz, 11 ch has the center frequency of 2,462 MHz and the band of 2,451 MHz to 2,473 MHz, 12 ch has the center frequency of 2,467 MHz and the band of 2,456 MHz to 2,478 MHz, 13 ch has the center frequency of 2,472 MHz and the band of 2,461 MHz to 2,483 MHz, 14 ch has the center frequency of 2,484 MHz and the band of 2,473 MHz to 2,495 MHz.

As described above, the frequency band of a channel overlaps with the frequency band of an adjacent channel. This is called an "overlap." Specifically, in a case of the "channel width of 20 MHz," three channels overlap with each other in the front and rear portions. In a case of the "channel width of 22 MHz," four channels overlap with each other in the front and rear portions. These channels are in the mutually interfering relationship.

That is, when one unit uses "1 ch" and another unit uses "2 ch" in a wireless communication, the channels interfere with each other. As a result, the communication may become unstable.

In a case where three (or four) channels overlap with each other, shifting the channels by the number of overlapping channels+1 avoids interference between the channels. If "1 ch, 5 ch, 9 ch, and 13 ch" are used in the case of the "channel width of 20 MHz," and "1 ch, 6 ch, 11 ch (2 ch, 7 ch, and 12 ch or 3 ch, 8 ch, and 13 ch)" are used in the case of the "channel width of 22 MHz," the communication becomes stable. Thus, the channels that may be expected to conduct a stable communication (non-overlapping channels) are the four (or three) channels.

As illustrated in the example of FIG. 4B, in IEEE802.11a/n/ac using the 5 GHz band, 19 channels are present in Japan and Europe. Not illustrated in FIG. 4B, in IEEE802.11a/n/ac using the 5 GHz band, 24 channels are present in the United States. The frequency bands of the respective channels are independent and do not interfere with each other. That is, the interference does not occur even if an adjacent channel is allocated. Thus, if the 5 GHz band is used, not only the interference with other devices disappears but also the interference with the channels disappears.

In addition, as the switching between the channels, a "channel bonding" function (a high speed mode) may be included. That is, as the switching between the channels, added are switching of a wireless communication which does not use the channel bonding function to a wireless communication which uses the channel bonding function, switching of a wireless communication which uses the channel bonding function to a wireless communication which does not use the channel bonding function and switching between wireless communications that use the channel bonding function. The channel bonding function is a technique of using two channels simultaneously and bonding the channels to each other so as to increase the communication speed. For example, the band occupied by one channel is 20 MHz. If the bands of two channels are bonded to each other, a communication is conducted in the 40 MHz band. It should be noted that if the channel bonding function is used, the number of available channels decreases, and the interference may easily occur. Further, a master device and an associated device are required to conform to the channel bonding function.

In addition, as the switching of a transmission method, "multiple input, multiple output (MIMO)" may be included. That is, as the switching between the transmission methods, added are changing of a wireless communication which does not use the MIMO to a wireless communication which uses the MIMO, changing of a wireless communication which uses the MIMO to a wireless communication which does not use the MIMO, and changing between antennas according to the MIMO The MIMO is a technique in which both a transmitter and a receiver use multiple antennas in a wireless communication so as to implement a high speed communication. In addition, a master device and an associated device are required to conform to the MIMO.

Figure 5:
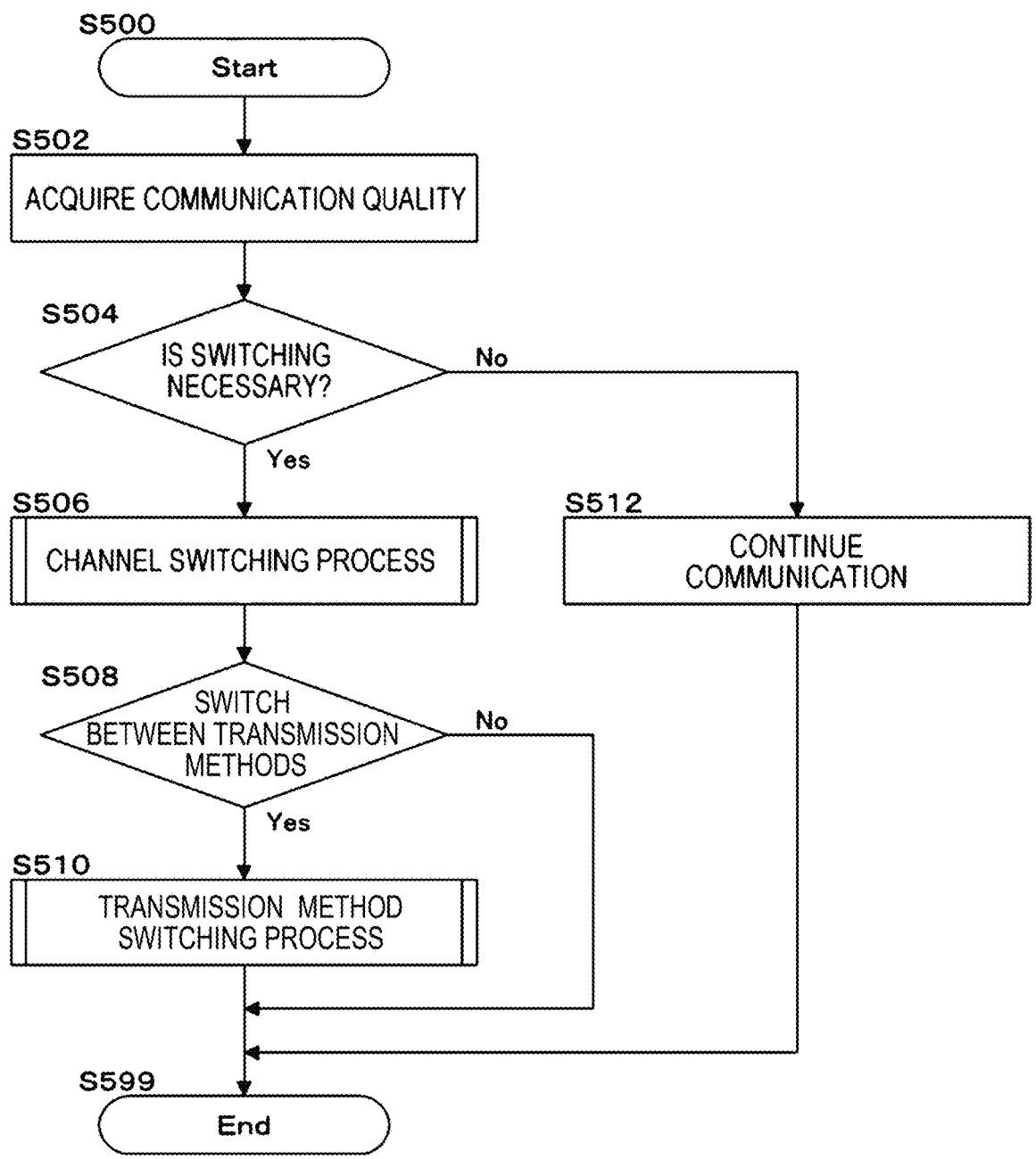
FIG. 5 is a flowchart illustrating an exemplary process by the exemplary embodiment.

FIG. 5 is a flowchart illustrating an exemplary process according to the present exemplary embodiment (information processing apparatus 100).

In step S502, the communication quality acquisition module 115 acquires the communication quality. The communication quality acquisition module 115 acquires the communication quality during the communication based on a signal received from the communication device 180 as a counterpart device. For example, as described above, the communication quality acquisition module 115 detects a reception level of a radio signal, an occurrence of disconnection of a wireless communication during the communication, and the like.

In step S504, the switching determination module 120 determines whether the switching is necessary. If it is determined that the switching is necessary, the process proceeds to step S506. Otherwise, the process proceeds to step S512. That is, it is determined whether (i) to continue the communication as it is or (ii) to change a channel and conduct a communication again (conduct a communication from the connection again).

In step S506, the channel switching module 125 performs a channel switching process. The detailed process of step S506 will be described later using the flowchart illustrated in an example of FIG. 6.

In step S508, the transmission method switching module 130 determines whether to switch between the transmission methods. If it is determined to switch between the transmission methods, the process proceeds to step S510. Otherwise, the communication using the new channel is continued.

In step S510, the transmission method switching module 130 performs a transmission method switching process. The detailed process of step S510 will be described later using the flowchart illustrated in an example of FIG. 9.

In step S512, the wireless communication module 135 continues the communication by the current transmission method and the current channel.

Figure 6:
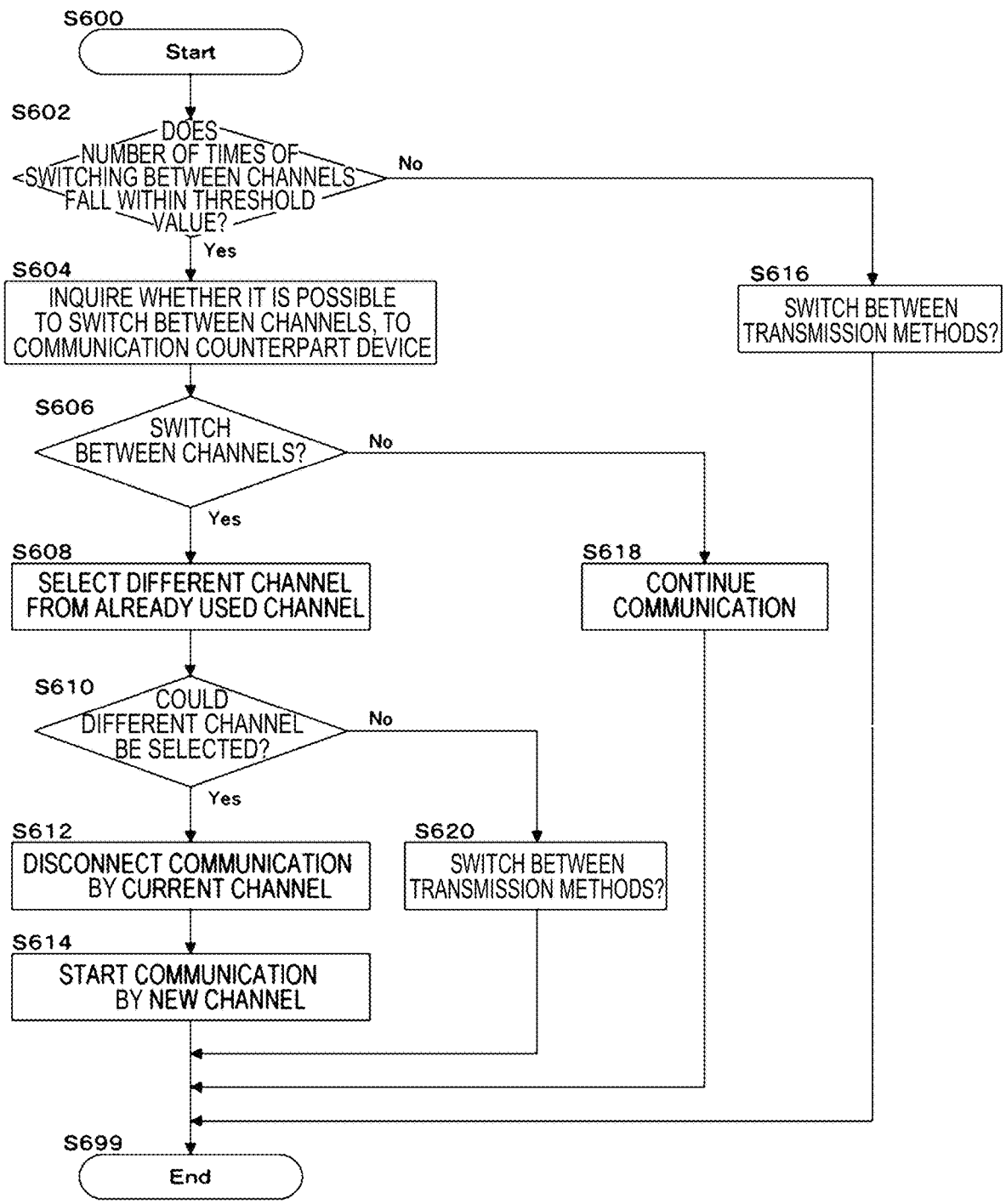
FIG. 6 is a flowchart illustrating an exemplary process by the exemplary embodiment.

FIG. 6 is a flowchart illustrating an exemplary process according to the present exemplary embodiment (channel switching module 125).

In step S602, it is determined whether the number of times of switching between the channels in the communication falls within a threshold value. If it is determined that the number of times of switching between the channels falls within the threshold value, the process proceeds to step S604. Otherwise, the process proceeds to step S616.

In step S604, it is inquired whether it is possible to switch between the channels, to the communication device 180 which is the communication counterpart device.

In step S606, it is determined whether a reply from the communication device 180 indicates switching between the channels. If it is determined that the reply indicates switching between the channels, the process proceeds to step S608. Otherwise, the process proceeds to step S618.

In step S608, a channel different from the already used channel is selected. For example, the different channel is selected using the channel use table 700 and the channel use table 800.

FIG. 7 is an explanatory view illustrating an exemplary data structure of the channel use table 700. The channel use table 700 has a channel column 710, an in-use column 720, and a used column 730. The channel use table 700 is used for the transmission method of IEEE802.11b/g/n using the frequency band of 2.4 GHz. The channel column 710 stores channels. The in-use column 720 stores whether each channel is currently in use. The used column 730 stores whether each channel was already used in a target communication. By excluding the already used channels, an occurrence of an endless loop is avoided.

In FIG. 7, the mark "o" indicates "currently in use" or "already used". Specifically, a channel that is not marked in the in-use column 720 and the used column 730 (a channel that is not indicated with the mark "o") is selected. In addition, as described above, a channel of a frequency band that does not overlap with a channel that is currently in use or was already used may be selected.

FIG. 8 is an explanatory view illustrating an exemplary data structure of the channel use table 800. The channel use table 800 has a channel column 810, an in-use column 820, and a used column 830. The channel use table 800 is used for the transmission method of IEEE802.11a/n/ac using the frequency band of 5 GHz. The channel column 810 stores channels. The in-use column 820 stores whether each channel is currently in use. The used column 830 stores whether each channel was already used in a target communication. By excluding the already used channels, an occurrence of an endless loop is avoided.

In FIG. 8, the mark "o" indicates "currently in use" or "already used". Specifically, a channel that is not marked in the in-use column 820 and the used column 830 (a channel that is not indicated with the mark "o") is selected.

In step S610, it is determined whether a channel could be selected in step S608. If it is determined that a channel could be selected, the process proceeds to step S612. Otherwise, the process proceeds to step S620.

In step S612, the communication by the current channel is disconnected.

In step S614, a communication is started by the new channel. At this time, a communication may be newly started from the beginning. Alternatively, only the remaining communication that could not be transmitted in the communication that has been conducted until now may be conducted.

In step S616, it is determined to switch between the transmission methods, and the process is ended (step S699). That is, in step S508 of the flowchart illustrated in the example of FIG. 5, it is determined that the answer is "Yes."

In step S618, the communication by the current channel is continued, and the process is ended (step S699).

In step S620, it is determined to switch between the transmission methods, and the process is ended (step S699). That is, in step S508 of the flowchart illustrated in the example of FIG. 5, it is determined that the answer is "Yes."

Figure 9:
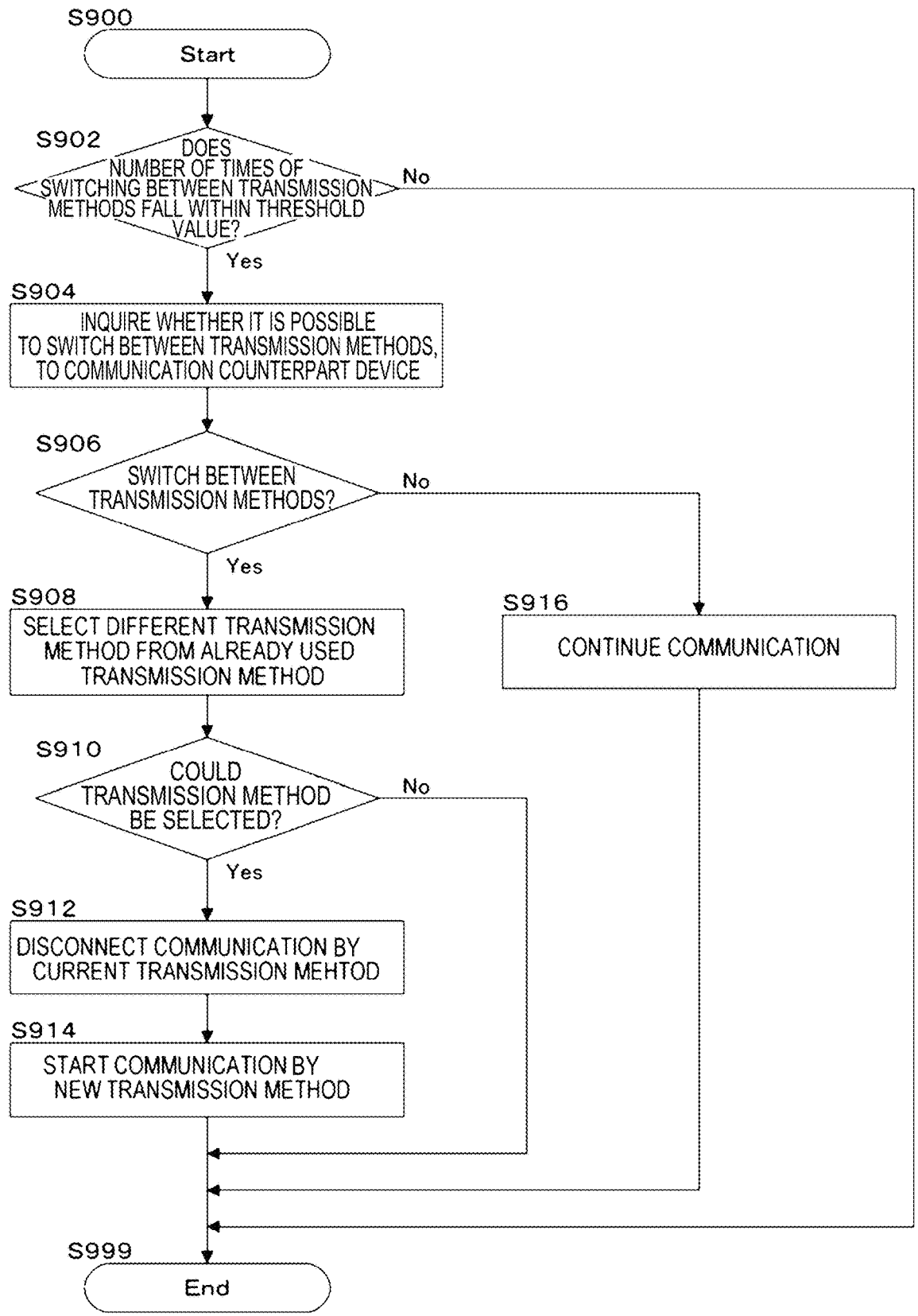
FIG. 9 is a flowchart illustrating an exemplary process by the exemplary embodiment.

FIG. 9 is a flowchart illustrating an exemplary process according to the present exemplary embodiment (transmission method switching module 130).

In step S902, it is determined whether the number of times of switching between the transmission methods in a communication in interest falls within a threshold value. If it is determined that the number of times of the transmission method switching falls within the threshold value, the process proceeds to step S904. Otherwise, the process is ended (step S999; that is, the communication is continued as it is).

In step S904, it is inquired whether it is possible to switch between the transmission methods, to the communication device 180 which is the communication counterpart device.

In step S906, it is determined whether a reply from the communication device 180 indicates switching between the transmission methods. If it is determined that the reply indicates performing the transmission method switching, the process proceeds to step S908. Otherwise, the process proceeds to step S916.

In step S908, a transmission method different from the already used transmission method is selected. For example, the different transmission method is selected using the transmission method use table 1000.

Figure 10:
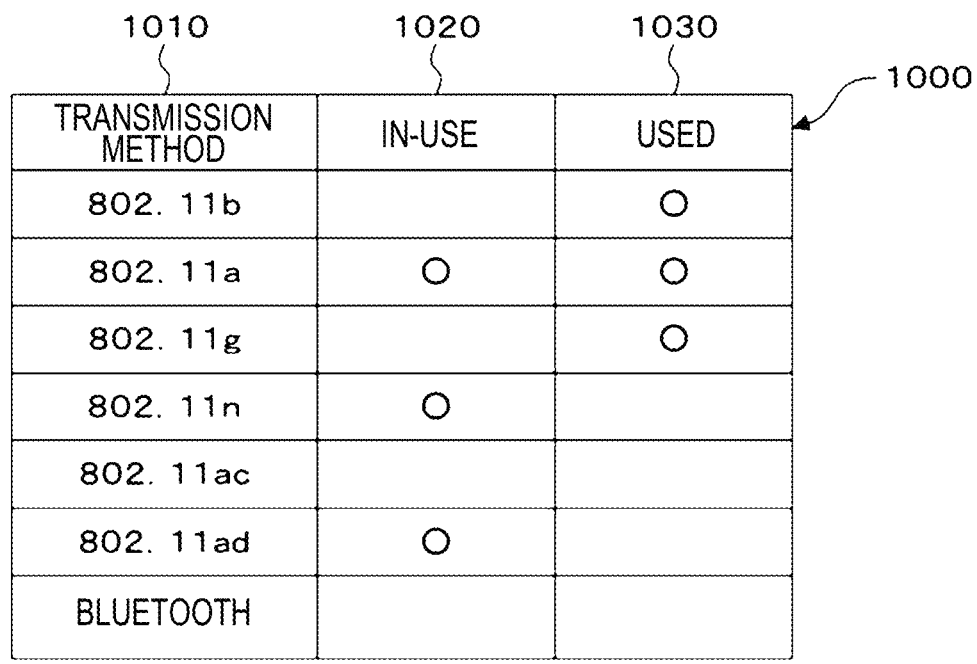
FIG. 10 is an explanatory view illustrating an exemplary data structure of a transmission method use table.

FIG. 10 is an explanatory view illustrating an exemplary data structure of the transmission method use table 1000. The transmission method use table 1000 includes a transmission method column 1010, an in-use column 1020, and a used column 1030. The transmission method column 1010 stores transmission methods. The in-use column 1020 stores whether each transmission method is currently in use. The used column 1030 stores whether each transmission method was already used in a target communication. By excluding the already used transmission methods, an occurrence of an endless loop is avoided.

In step S910, it is determined whether a transmission method could be selected in step S908. If it is determined that a transmission method could be selected, the process proceeds to step S912. Otherwise, the process is ended (step S999).

In step S912, the communication by the current transmission method is disconnected.

In step S914, a communication is started by the new transmission method. At this time, a communication may be newly started from the beginning. Alternatively, only the remaining communication that could not be transmitted in the communication that has been conducted until now may be conducted.

In step S916, the communication by the current transmission method is continued as it is, and the process is ended (step S999).

An exemplary hardware configuration of the information processing apparatus of the present exemplary embodiment will be described with reference to FIG. 11. The configuration illustrated in FIG. 11 is implemented by, for example, a personal computer (PC), and represents an exemplary hardware configuration provided with a data reading unit 1117 such as a scanner and a data output unit 1118 such as a printer.

Figure 11:
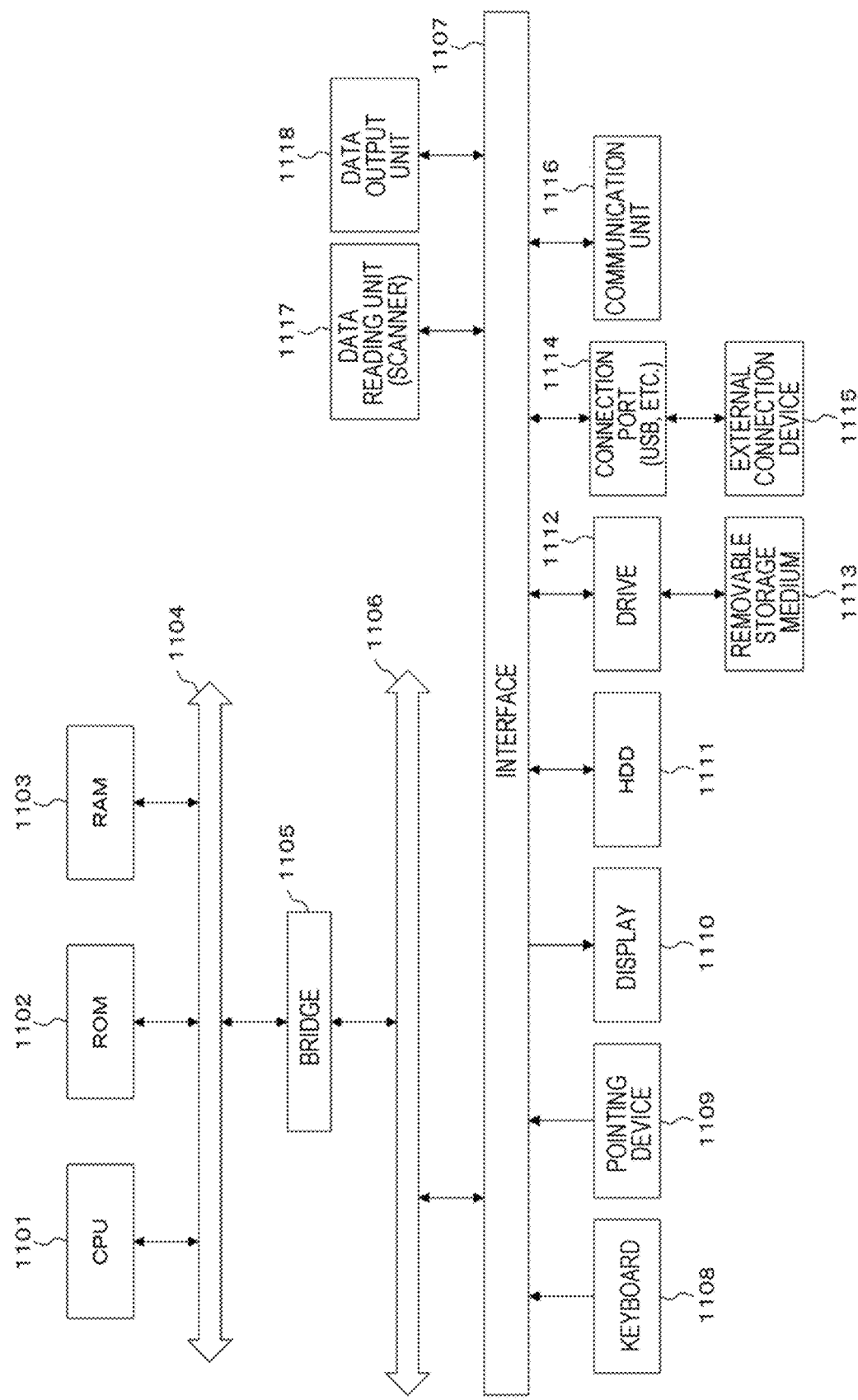
FIG. 11 is a block diagram illustrating an exemplary hardware configuration of a computer implementing the exemplary embodiment.

Further, while the example illustrated in FIG. 3 represents the configuration mainly serving as a chip using the ASIC or the like, the example illustrated in FIG. 11 mainly represents a functional configuration that is implemented by a personal computer or the like. For example, a CPU 1101 takes in charge of the functions by the SoC 300 and the ASIC 330.

The CPU 1101 is a controller that performs processes according to a computer program describing an execution sequence of each of the various modules described in the above-described exemplary embodiment, that is, the communication control module 110, the communication quality acquisition module 115, the switching determination module 120, the channel switching module 125, the transmission method switching module 130, the wireless communication module 135 and the like.

A read only memory (ROM) 1102 stores programs, operation parameters, and the like used by the CPU 1101. A RAM 1103 stores programs used in the execution by the CPU 1101, parameters appropriately varying in the execution, and the like. These components are connected to each other by a host bus 1104 configured with a CPU bus or the like.

The host bus 1104 is connected to an external bus 1106 such as a peripheral component interconnect/interface (PCI) bus via a bridge 1105.

A keyboard 1108 and a pointing device 1109 such as a mouse are devices operated by an operator. A display 1110 is, for example, a liquid crystal display device or a cathode ray tube (CRT), and displays various types of information as texts and image information. In addition, a touch screen or the like having the functions of both the pointing device 1109 and the display 1110 may be used. In this case, the function of the keyboard may be implemented by drawing the keyboard using software (also called a so-called software keyboard, screen keyboard or the like) on the screen (the touch screen), without the physical connection like the keyboard 1108.

A hard disk drive (HDD) 1111 is equipped with a hard disk (which may be a flash memory or the like) therein, drives the hard disk, and stores or plays programs or information executed by the CPU 1101. The hard disk stores the channel use table 700, the channel use table 800, the transmission method use table 1000, communication contents and the like. Further, in the hard disk, other various data and various computer programs are stored.

A drive 1112 reads data and programs stored in a removable storage medium 1113 such as a mounted magnetic disk, optical disc, magneto-optical disc, or semiconductor memory, and supplies the data or programs to the interface 1107, the external bus 1106, the bridge 1105, and the RAM 1103 connected via the host bus 1104. In addition, the removable storage medium 1113 may also be used as a data storage area.

A connection port 1114 is a port for connection of an external connection device 1115, and includes connection units such as USB and IEEE 1394. The connection port 1114 is connected to the CPU 1101 and the like via the interface 1107, the external bus 1106, the bridge 1105, the host bus 1104, and the like. A communication unit 1116 is connected to a communication line and performs a process of a data communication with an external device. The data reading unit 1117 is, for example, a scanner and performs a document reading process. The data output unit 1118 is, for example, a printer, and performs a document data outputting process.

The hardware configuration of the information processing apparatus illustrated in FIG. 11 represents an exemplary configuration. The present exemplary embodiment is not limited to the configuration illustrated in FIG. 11, and may be any configuration that may execute the modules described in the present exemplary embodiment. For example, some of the modules may be configured with dedicated hardware (for example, application specific integrated circuit (ASIC)), and some of the modules may be in the form in which the modules are present in an external system and connected via a communication line. Further, the multiple systems illustrated in FIG. 11 may be connected to each other via a communication line and cooperate with each other. In addition, especially, the multiple systems of FIG. 11 may be incorporated in a personal computer, a portable information communication device (including a mobile phone, a smart phone, a mobile device, a wearable computer, and the like), an information appliance, a robot, a copying machine, a facsimile, a scanner, a printer, a multi-functional machine (an image processing apparatus having two or more functions of a scanner, a printer, a copying machine, a facsimile and, the like), and the like.

In the comparing process described in the above-described exemplary embodiment, the expressions "equal to or more than," "equal to or less than," "larger than," and "smaller than (not exceeding)" may be replaced with "larger than," "smaller than (not exceeding)," "equal to or more than," and "equal to or less than," respectively unless the replacement causes contradiction.

In addition, if the communication quality is not improved even by changing a channel, the transmission method may be switched to another transmission method. Here, the case where "the communication quality is not improved" specifically corresponds to (i) a case where a difference between values of the communication quality before and after the channel switching is within a predetermined value or (ii) a case where the communication quality is deteriorated after the channel switching in comparison with that before the channel switching.

The above-described programs may be provided in the form of being stored in a storage medium or provided by a communication unit. In this case, for example, the above-described programs may be construed as an invention of a "computer readable storage medium storing a program."

The "computer readable storage medium storing a program" refers to a computer readable storage medium storing a program, which is used for installation, execution, distribution, and the like of a program.

The storage medium includes, for example, a digital versatile disc (DVD) such as "DVD-R, DVD-RW, DVD-RAM or the like" which is the standard formulated in the DVD forum, "DVD+R, DVD+RW or the like" which is the standard formulated in DVD+RW, a compact disc (CD) such as a CD read only memory (CD-ROM), a CD recordable (CD-R), or a CD rewritable (CD-RW), a Blu-ray disc (Blu-ray (registered trademark) disc), a magneto-optical (MO) disc, a flexible disk (FD), a magnetic tape, a hard disk, a ROM, an electrically erasable and rewritable read only memory (EEPROM (registered trademark)), a flash memory, a random access memory (RAM), and a secure digital (SD) memory card.

All or some of the above-described programs may be stored in the storage medium so as to be saved or distributed. Further, the programs may be transmitted using a transmission medium such as a wired network used in a local area network (LAN), a metropolitan area network (MAN), a wide area network (WAN), the Internet, the Intranet, the Extranet, and the like, a wireless communication network, or a combination thereof, or may be carried on carrier waves.

In addition, the above-described programs may be all or parts of other programs, or may be stored together with separate programs in the storage medium. In addition, the above-described programs may be divided and stored in multiple storage media. In addition, the above-described programs may be stored in a compressed or encrypted form as long as the programs may be restored.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
   a processor programmed to:
      conduct a wireless communication using a plurality of transmission methods, at least one of which has a plurality of channels;
      while conducting a communication using a respective one of the plurality of transmission methods, switch between channels of the respective transmission method according to quality of the communication that is being conducted;
      in response to determining that there is no channel among the channels of the respective transmission method that (i) is not currently in-use and (ii) has not been used by the communication that is being conducted, switch the respective transmission method to a different one of the plurality of transmission methods;
      in response to determining that a number of switching between the channels of the respective transmission method is greater than or equal to a predetermined value, instead of switching between the channels of the respective transmission method, switch the respective transmission method to a different one of the plurality of transmission methods, regardless of whether there is a channel of the respective transmission method that has not been used by the communication;
      count the number of switching between the channels of the respective transmission method as a first number; and
      count a number of switching between the plurality of transmission methods as a second number, wherein
      the respective transmission method is switched to the different one of the plurality of transmission methods after determining that the first number is greater than or equal to the predetermined value and determining that the second number is smaller than another predetermined value.

2. The information processing apparatus according to claim 1, wherein the processor is programmed to:
   in response to determining that a channel different from an already selected channel cannot be selected, switch the respective transmission method to the different one of the plurality of transmission methods.

3. The information processing apparatus according to claim 2, wherein the processor is programmed to:
   in response to determining that a channel of a frequency band that does not overlap with the already selected channel cannot be selected, switch the respective transmission method to the different one of the plurality of transmission methods.

4. The information processing apparatus according to claim 1, wherein the plurality of transmission methods include IEEE802.11ad.

5. The information processing apparatus according to claim 4, wherein the respective transmission method is switched to the different one of the plurality of transmission methods, the different transmission method being IEEE802.11ad.

6. A non-transitory computer readable storage medium storing an information processing program that, when executed, causes a computer to:
   conduct a wireless communication using a plurality of transmission methods, at least one of which has a plurality of channels;
   while conducting a communication using a respective one of the plurality of transmission methods, switch between channels of the respective transmission method according to quality of the communication that is being conducted;
   in response to determining that there is no channel among the channels of the respective transmission method that (i) is not currently in-use and (ii) has not been used by the communication that is being conducted, switch the respective transmission method to a different one of the plurality of transmission methods;
   in response to determining that a number of switching between the channels of the respective transmission method is greater than or equal to a predetermined value, instead of switching between the channels of the respective transmission method, switch the respective transmission method to a different one of the plurality of transmission methods, regardless of whether there is a channel of the respective transmission method that has not been used by the communication;
   count the number of switching between the channels of the respective transmission method as a first number; and count a number of switching between the plurality of transmission methods as a second number, wherein the respective transmission method is switched to the different one of the plurality of transmission methods after determining that the first number is greater than or equal to the predetermined value and determining that the second number is smaller than another predetermined value.

7. A method executed by an information processing apparatus, the method comprising:

conducting a wireless communication using a plurality of transmission methods, at least one of which has a plurality of channels;

while conducting a communication using a respective one of the plurality of transmission methods, switching between channels of the respective transmission method according to quality of the communication that is being conducted;

in response to determining that there is no channel among the channels of the respective transmission method that (i) is not currently in-use and (ii) has not been used by the communication that is being conducted, switching the respective transmission method to a different one of the plurality of transmission methods;

in response to determining that a number of switching between the channels of the respective transmission method is greater than or equal to a predetermined value, instead of switching between the channels of the respective transmission method, switching the respective transmission method to a different one of the plurality of transmission methods, regardless of whether there is a channel of the respective transmission method that has not been used by the communication;

counting the number of switching between the channels of the respective transmission method as a first number; and counting a number of switching between the plurality of transmission methods as a second number, wherein the respective transmission method is switched to the different one of the plurality of transmission methods after determining that the first number is greater than or equal to the predetermined value and determining that the second number is smaller than another predetermined value.

8. The information processing apparatus according to claim 1, wherein the plurality of transmission methods includes at least three of IEEE802.11a, IEEE802.11b, IEEE802.11c, IEEE802.11g, IEEE802.11n, IEEE802.11ac, IEEE802.11j, IEEE802.11ad, and Bluetooth.

9. The non-transitory computer readable storage medium according to claim 6, wherein the information processing program, when executed, causes the computer to:

in response to determining that a channel different from an already selected channel cannot be selected, switch the respective transmission method to the different one of the plurality of transmission methods.

10. The non-transitory computer readable storage medium according to claim 9, wherein the information processing program, when executed, causes the computer to:

in response to determining that a channel of a frequency band that does not overlap with the already selected channel cannot be selected, switch the respective transmission method to the different one of the plurality of transmission methods.

11. The non-transitory computer readable storage medium according to claim 6, wherein the plurality of transmission methods include IEEE802.11ad.

12. The non-transitory computer readable storage medium according to claim 11, wherein the respective transmission method is switched to the different one of the plurality of transmission methods, the different transmission method being IEEE802.11ad.

13. The non-transitory computer readable storage medium according to claim 6, wherein the plurality of transmission methods includes at least three of IEEE802.11a, IEEE802.11b, IEEE802.11c, IEEE802.11g, IEEE802.11n, IEEE802.11ac, IEEE802.11j, IEEE802.11ad, and Bluetooth.

14. The method according to claim 7, wherein the method comprises:

in response to determining that a channel different from an already selected channel cannot be selected, switching the respective transmission method to the different one of the plurality of transmission methods.

15. The method according to claim 14, wherein the method comprises:

in response to determining that a channel of a frequency band that does not overlap with the already selected channel cannot be selected, switching the respective transmission method to the different one of the plurality of transmission methods.

16. The method according to claim 7, wherein the plurality of transmission methods include IEEE802.11ad.

17. The method according to claim 16, wherein the respective transmission method is switched to the different one of the plurality of transmission methods, the different transmission method being IEEE802.11ad.

18. The method according to claim 7, wherein the plurality of transmission methods includes at least three of IEEE802.11a, IEEE802.11b, IEEE802.11c, IEEE802.11g, IEEE802.11n, IEEE802.11ac, IEEE802.11j, IEEE802.11ad, and Bluetooth.

* * * * *